United States Patent [19]
Cooper

[11] Patent Number: 6,078,038
[45] Date of Patent: Jun. 20, 2000

[54] APPARATUS AND METHOD FOR DISPLAYING A HIGH RESOLUTION IMAGE WITH RELATIVELY LOWER RESOLUTION DISPLAY DEVICE

[76] Inventor: J. Carl Cooper, 15288 Via Pinto, Monte Sereno, Calif. 95030

[21] Appl. No.: 09/307,472

[22] Filed: May 10, 1999

Related U.S. Application Data

[62] Division of application No. 09/074,302, May 6, 1998, Pat. No. 5,949,087, which is a division of application No. 08/775,478, Dec. 30, 1996, Pat. No. 5,793,053, which is a division of application No. 08/730,768, Oct. 16, 1996, Pat. No. 5,635,725, which is a continuation of application No. 08/195,422, Feb. 15, 1994, abandoned.

[51] Int. Cl.[7] .................................................. H01L 27/00
[52] U.S. Cl. ........................................ 250/208.1; 250/234
[58] Field of Search ........................... 250/208.1, 559.3, 250/559.29, 234; 348/103, 747, 106, 98, 99; 345/8, 9, 87, 90, 84

[56] References Cited

U.S. PATENT DOCUMENTS

| | | |
|---|---|---|
| 3,544,207 | 12/1970 | John, Jr. . |
| 3,753,612 | 8/1973 | Okey . |
| 4,296,438 | 10/1981 | Stemme et al. . |
| 5,194,958 | 3/1993 | Pearman et al. . |
| 5,583,694 | 12/1996 | Takahashi et al. ....................... 359/557 |
| 5,748,264 | 5/1998 | Hegg ....................................... 348/746 |

*Primary Examiner*—Que T. Le
*Attorney, Agent, or Firm*—J. Carl Cooper

[57] ABSTRACT

The present disclosure teaches a method and apparatus for displaying relatively higher resolution image using a lower resolution display element. The preferred embodiment of the invention operates to display a high resolution image by use of a plurality of frames of lower resolution images, with the lower resolution frames being shifted relative to one another by use of an optical element which alters the light path of the display.

11 Claims, 5 Drawing Sheets

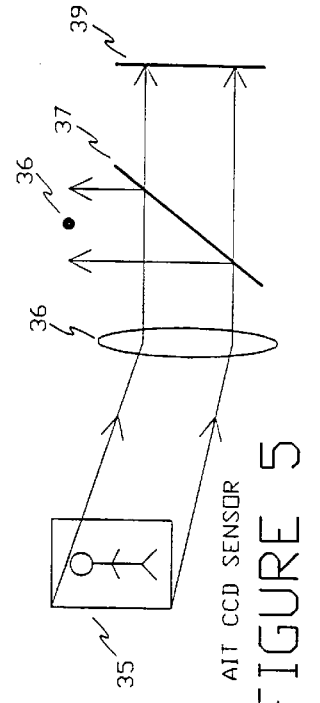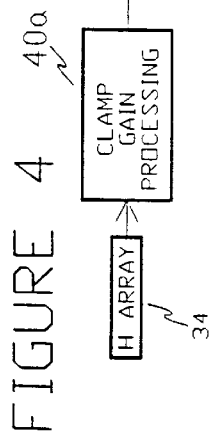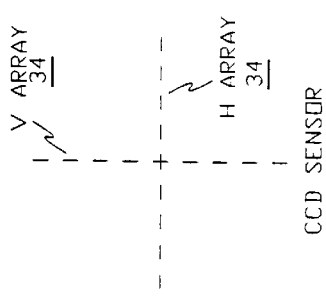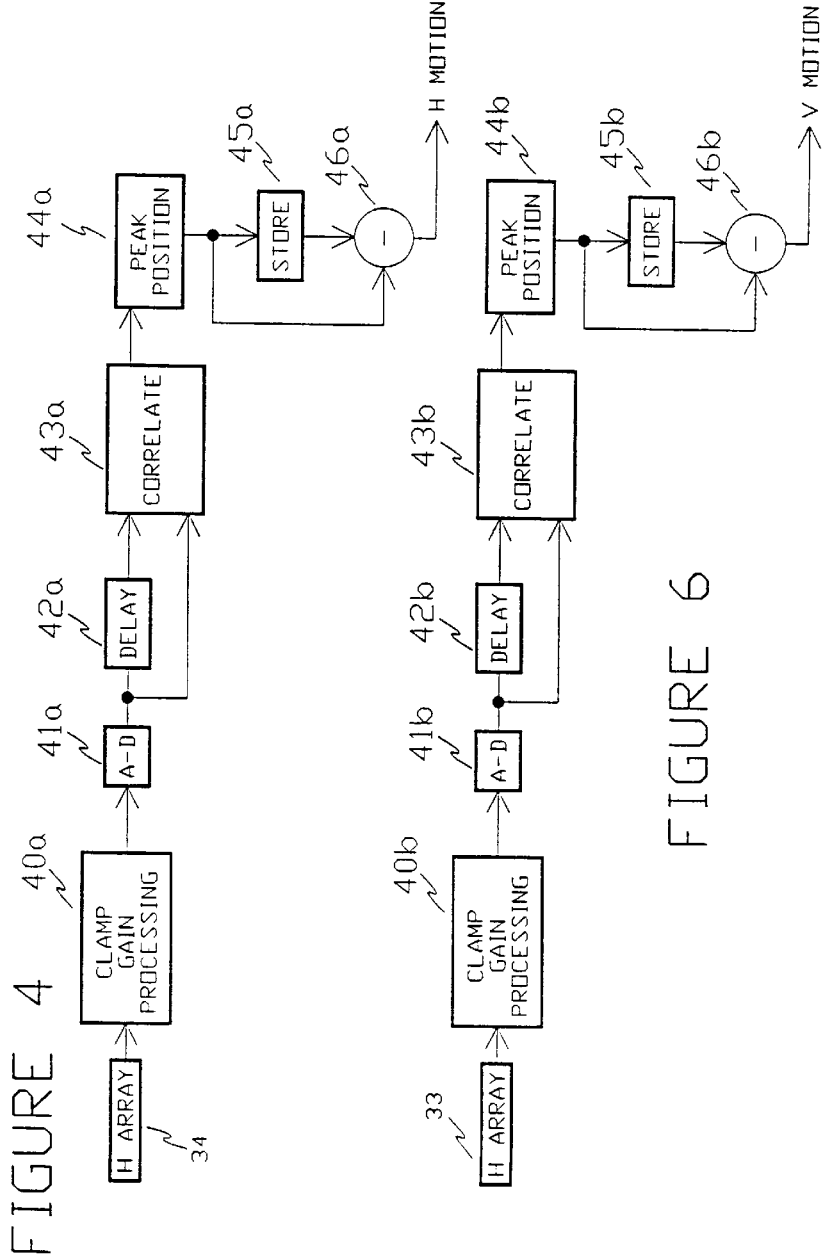

APPARATUS AND METHOD FOR DISPLAYING A HIGH RESOLUTION IMAGE WITH RELATIVELY LOWER RESOLUTION DISPLAY DEVICE

This application is a divisional application of U.S. patent application Ser. No. 09/074,302, filed May 06, 1998, now U.S. Pat. No. 5,949,087, which is a division of application Ser. No. 08/775,478 filed Dec. 30, 1996, now U.S. Pat. No. 5,793,053 which is a division of application Ser. No. 08/730,768 filed Oct. 16, 1996, now U.S. Pat. No. 5,635,725, which is a continuation of application Ser. No. 08/195,422 filed Feb. 15, 1994, abandoned, which applications are fully incorporated herein by reference.

BACKGROUND OF THE INVENTION

1. Field of the Invention

This invention relates to the field of spatially stabilizing electromagnetic radiation images which are the result of radiation incident on a reflective or transmissive surface. The invention finds particular use for stabilizing projected optical images from projectors such as film and television projectors, graphics printers or images photographed by a camera such as a still video or television camera.

In the presentation, viewing or capture of images, problems often occur due to mechanical imperfections such as vibrations, distortions, tolerance buildup, wear, chemical stability, electrical noise and a host of other forms of mechanical, optical, chemical and electrical problems. These problems can cause movement, jitter and/or ion of the image, whether the image is being presented for viewing by biological eyes, analysis by machines, viewed for entertainment or captured for storage Electro mechanical and optical mechanical devices such as projectors and cameras are highly susceptible to such problems. These problem are present no matter what type of electromagnetic radiation is being utilized, be it optical, microwave, X-ray, cosmic rays etc. Any electromagnetic image or image instrument which is subject to mechanical vibration in the utilization thereof may be improved by the present invention.

One of the most common of mechanical effects occurs with film projectors and is called gate weave in the motion picture industry. Gate weave results in a moving and jittery image being presented on the motion picture screen when the movie is projected due to slight movement of the projected film image. The main cause of gate weave in this instance is the improper positioning of the film image in the film gate or aperture of the projector from one frame to the next. The improper positioning of the image is a result of the above mentioned problems, either in the projector, the camera shooting the film or the intermediate film processing, but most commonly is due to the wear and tear of the sprocket holes in the projected film occurring over prolonged use. The sprocket holes are used by the projector intermittent gear to position the film in the projector aperture for the momentary presentation of each frame, with the edges of the holes requiring critical alignment with respect to the film image. As the film is projected over and over, these edges tend to wear unevenly.

In addition, for very old films, chemical changes in the film emulsion and/or base cause physical distortion of the film image with respect to the sprocket holes and film edges. These problems also result in gate weave.

While it is possible to minimize the various effects mentioned above, the problem of wear of the sprocket holes as well as chemical distortion of the film emulsion or base over time remain as serious problems which are not generally correctable after the damage occurs. It is desirable then to reduce the visibility of such movement, jitter and/or distortion during the projection of the film in order to present a more stable image for the aforementioned viewing. In addition when the image is being viewed by a machine, such as by a television camera, it is often necessary to stabilize the image on the image sensing element.

In addition to film gate weave, there are many types of image presentations where image movement and jitter are problematic, either due to the image system itself, or due to the system being required to display or view images which have had movement or jitter "recorded in". Generally, anytime it is desired to mechanically focus or align an image jitter and movement can be a problem. Such recording in often happens when the image was generated or transferred from one storage medium to another, and results in the jitter being recorded into the image. Beyond such recording in, no amount of mechanical stability correction of the image media can correct the jitter. What is needed it corrective canceling mechanical jitter of the image media itself, the image recovered therefrom or the projected or viewed image to effect stability. This corrective canceling action would be required even if the subsequent projection or viewing of the image were made without any jitter or other mechanical problems at all. For example, if a video tape recording were made of a jittering film, the present invention could preferably be used to correct the film jitter during the recording, or if such were inconvenient or impossible, the invention could be used to correct the subsequent use of the video tape recording.

Examples of such systems which might be required to display a moving, jittery or distorted image include electro and optical mechanical printers, projectors and viewers as well as television and computer displays and printers, including more familiar electronic displays.

2. Description of the Prior Art

In the Prior art it is known to apply considerable mechanical precision to the movement and holding of the image bearing or image receiving element of imaging systems. In particular film projectors having elaborately designed film movement and intermittent mechanics are well known. In the field of acquiring images, such as in film and television cameras, elaborate spring, and other types of vibration and movement damping mechanisms are used, these including electromechanical gyroscope mechanisms to hold the camera or its mounting platform steady.

It is also known in the television industry to electronically correct a jittering television image by the electronic process of moving the video image signal with respect to its horizontal and vertical synchronizing pulses with the aid of complex motion detection circuits and frame memory control. Such systems do not lend themselves to improvement of existing projection and camera equipment and in particular to the improvement of existing motion picture film and television projectors.

OBJECTS OF THE INVENTION

It is an object of the invention to stabilize an image in a first form by sensing its position with respect to a reference and altering its conveyance path in response thereto in order to improve the stability of the image in the first or another form.

It is another object of the invention to position an electromagnetic radiation image by sensing the image in a first form and altering the path of the electromagnetic radiation which creates the image in the first or a second form in order to improve the positional accuracy of the image.

It is a yet another object of the invention to stabilize an optical image by sensing its position and refracting the light which creates the image in response thereto in order to improve the stability of the image.

It is still another object of the invention to sense an optical image to be stabilized, compare the position of the image from one moment in time to another to determine a displacement value responsive to the displacement thereof in at least one dimension and changing an optical correction element located in the light path of the image in response to the displacement value to cause a compensating displacement of the image.

It is a further object of the invention to sense the position of a series of projected image frames to be stabilized before projection, compare the position of the image from one frame to the image from another frame to determine a displacement value responsive to the displacement thereof and changing an optical correction element located in the light path of the projected image in response to the displacement value to cause a compensating displacement of the projected image.

It is yet a further object of the invention to sense the position of an electromagnetic radiation image which is to be recorded by a recording element in a series of frames, to stabilized that image before and/or during recording, by comparing the position of the image from one time to another to determine a displacement value responsive to the displacement thereof on the recording element, and changing a electromagnetic radiation correction element located in the radiation path of the recorded image in response to the displacement value to cause a compensating displacement of the recorded image on the recording element.

It is still a further object of the invention to allowing sensing of an image in a fashion which does not interfere with the projection or the recording of the image in order that the image may be stabilized before and/or during such projection or recording.

It is further another object of the invention to sense an image position as conveyed in a first electromagnetic form and correct the image position as conveyed in a second electromagnetic form.

It is yet further another object of the invention to sense an image position at a first location and correct the image position in a second location.

It is still further another object of the invention to sense an image position at a first time and correct the image position at a second time.

It is yet still further another object of the invention to correct an image position by tilting an optical flat in the radiation beam of that image.

Other objects and a fuller understanding of the invention may be had by referring to the following description and claims, taken in conjunction with the accompanying drawings, in which:

BRIEF DESCRIPTION OF THE DRAWINGS

FIG. 4 shows a diagram of an embodiment of the sense CCD array element 7.

FIG. 5 shows another embodiment of the sense CCD array element 7.

FIG. 6 shows a diagram of an embodiment of the invention as used with the sense CCD array of FIG. 4 or 5.

DESCRIPTION OF THE PREFERRED EMBODIMENT

Figure 1:
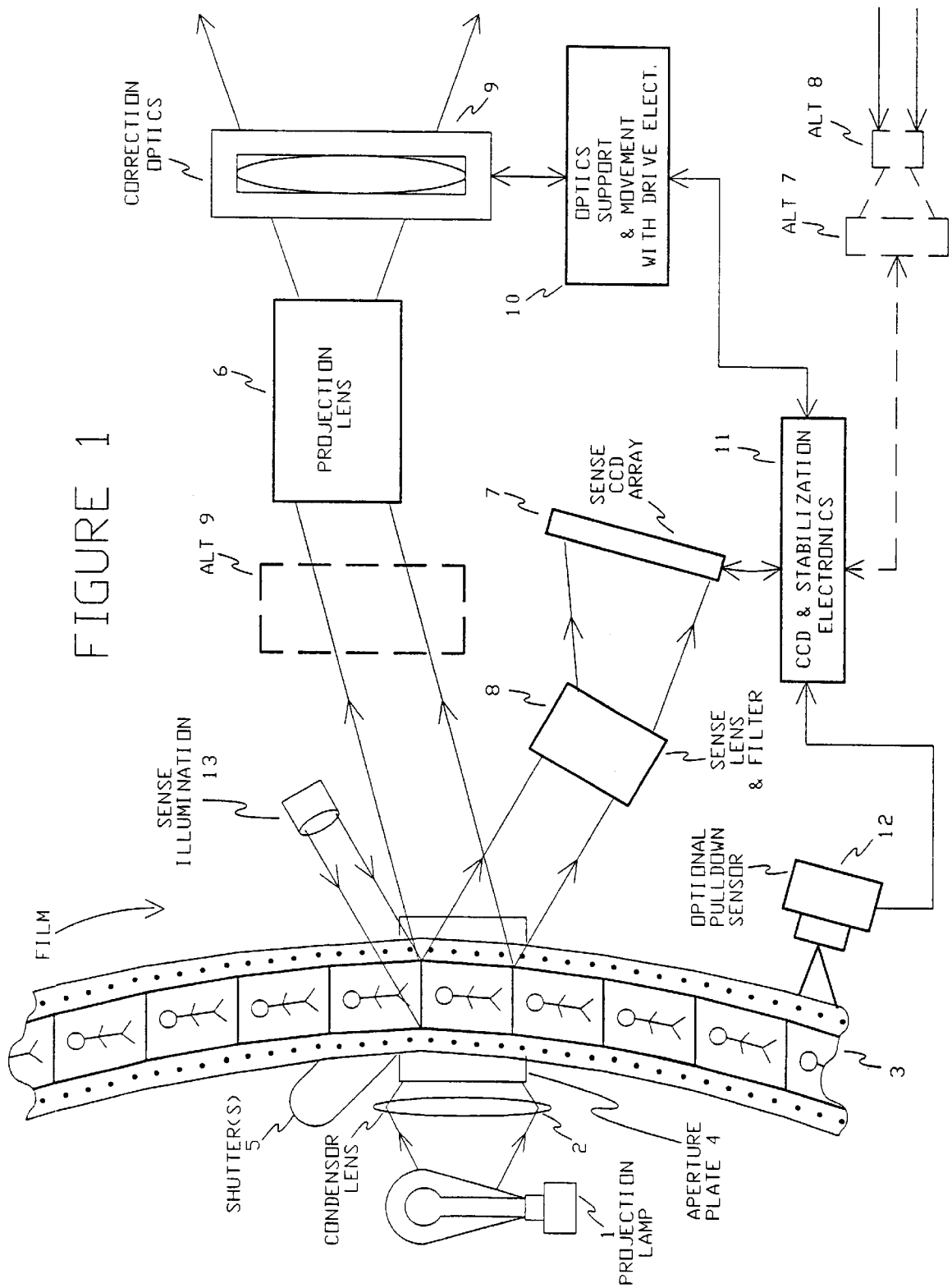
FIG. 1 shows a diagram of the preferred embodiment of the invention as used with a film projector.

FIG. 1 shows a diagram of the preferred embodiment of the invention as used in motion picture film projection. The invention consists of prior art projection elements including the projection lamp 1 condenser lens 2 moving film 3, film aperture plate 4, shutter 5 which may be modified according co the invention and projection lens 6. It should be noted that often the condenser lens 2 is replaced by or augmented with a spherical or elliptical mirror behind the projection lamp 1. This diagram may also represent an electronic projector by replacing the film with an LCD array as is commonly known. It will be realized by one skilled in the art that this diagram could also represent an image acquisition system if the light is coming in the lens and the film or a CCD array were being exposed as will be discussed later with respect to FIG. 3.

The invention includes the addition of an image sensor CCD array 7 with image focusing mirror 8 operable to focus the film image on the sensor. It is shown in preferred form that the sensor be arranged to view the film frame within the aperture directly, however it may also be arranged to view the projected image on the screen as is shown by ALT. 7 and ALT. 8.

Further parts of the invention include correction optics 10 operable to deflect the light of the projected image which emanates from the projection lens. The correction optics are preferred to include a movable lens element which element is driven by electronic voice coil actuators whereby the movement of the lens element is effected by varying the current in the voice coil. It is preferred to use two axis movement, horizontal and vertical, with two sets of voice coil actuators. These actuators and their associated electronics are shown in 10. Alternatively, the correction optics may be placed between the projection lens and film as shown by Alt. 9, or may be incorporated otherwise to move the projected image, for example by incorporation in the projection lens 6 or by physically moving the film 3 in or with the aperture. It is preferred however that the correction optics be located directly in front of the lens in order to minimize the cost of adding such to existing projectors. The control of the correction optics 9 is performed via the optics support and movement 10 by the CCD and stabilizing electronics 11. The motion of the film between frames is sensed, such as by a pulldown sensor 12 which optically senses the sprocket holes of the film. When the film is moving, either a sprocket hole is moving past the sensor, or there is no hole in front of the sensor. When the film is steady, a sprocket hole remains stably in front of the sensor. Alternatively, the pulldown sensor may be coupled to the intermittent sprocket or to the Geneva movement, or the motion of the film may be detected by detecting the actual movement of the image via the CCD array 7.

In operation, the shutter(s) 5 block the light from the projection lamp and the film is moved to the next frame by the intermittent gear, as is well known in the art. The movement of the film is sensed by one of the various methods taught above, and at the precise moment when the film movement is stopped at the new frame, the CCD sensor 7 is strobed to take an instant snap shot of the new image in its stable position. The CCD and stabilizing electronics measures the position of the new frame image relative to the previous frame image, and sends two correction signals, one horizontal and one vertical, to the optics support and movement circuits 10 which cause the correction optics 9 to reposition the image from the new frame to match the image position from the previous frame. The Shutter(s) 5 then open to allow light to pass through the film and onto the screen via the projection lens 6 and correction optics 9.

It is important that the image be positioned before the shutter opens fully. In a normal Geneva intermittent, the shutter is closed for some 60° of the 360° intermittent cycle. At the conventional projection speed of 24 frames per second the shutter will be closed for about 7 milliseconds. The film will be stable for only a fraction of a millisecond before the shutter starts to open. While it is not absolutely necessary that the image be positioned before the shutter starts to open, it is nevertheless desirable in order to prevent image ghosting which is caused by image movement after some light is let through the shutter. In order to allow the CCD array to view the film image before light is let through the shutter, an alternate film illuminator 13 is used.

It is preferred that this illumination from 13 be invisible to the image observer, thus ultraviolet illumination and sensing is preferred. The image sense lens 8 is preferred to include a filter coating which passes only ultraviolet light. This has the advantage of allowing the CCD array to have a relative constant illumination which is somewhat independent of the shutter operation. Keeping in mind that the projection lamp 1 may well emit a considerable amount of ultraviolet light which will be shuttered onto the CCD array, it would be desirable to add an ultraviolet block filter at the location of the condenser lens 2.

Alternatively, the ultraviolet energy from projection lamp 1 can be used to illuminate the film frame for the CCD array and thus eliminate the need for the separate sense illumination 13. Such operation may be accomplished by one skilled in the art by replacing the shutter(s) 5 with a material which passes ultraviolet light but blocks visible light. Other suitable illumination schemes may be had to achieve the desired operation of illuminating the new film frame just after intermittent movement has stopped, without passing appreciable visible illumination to the viewer, for example by combinations of visible and invisible illumination, or by adding shuttering, for example by moving shutter 5 between the film and projection lens, or in front of the projection lens.

It should be noted here that near ultraviolet light is preferred to far ultraviolet. Often the film stock is prepared by formulation or coating to specifically reflect ultraviolet light in order to reduce damage to the film and emulsion. Near ultraviolet will often penetrate sufficiently for successful operation while far ultraviolet will fail. Alternatively, infrared may be utilized, however given the amount of stray infrared caused by the heating of the aperture by the projection lamp, such is not as desirable as ultraviolet.

Other wavelengths may be used as well, including visible wavelengths at low intensity without additional shuttering or at high intensity with additional shuttering. In particular, an additional shutter such as an LCD may be added to the correction optics to block the sense illumination during film movement and during image correction. This additional shutter may even be caused to open lagging the first shutter 5 opening by a small amount of time to give the correction optics time to position. Such lag will of course cause a slight dimming of the projected image and depending on the projection light intensity may create some heat dissipation problems.

Optical lenses, filters and other components to construct the above preferred embodiment of the invention are well known to those of ordinary skill in the art and are available from numerous sources including Edmund Scientific, 101 E. Gloucester Pike, Barrington, N.J. 08007 and Oriel Corporation, 250 Long Beach Blvd. Stratford, Conn. 06497.

Figure 2:
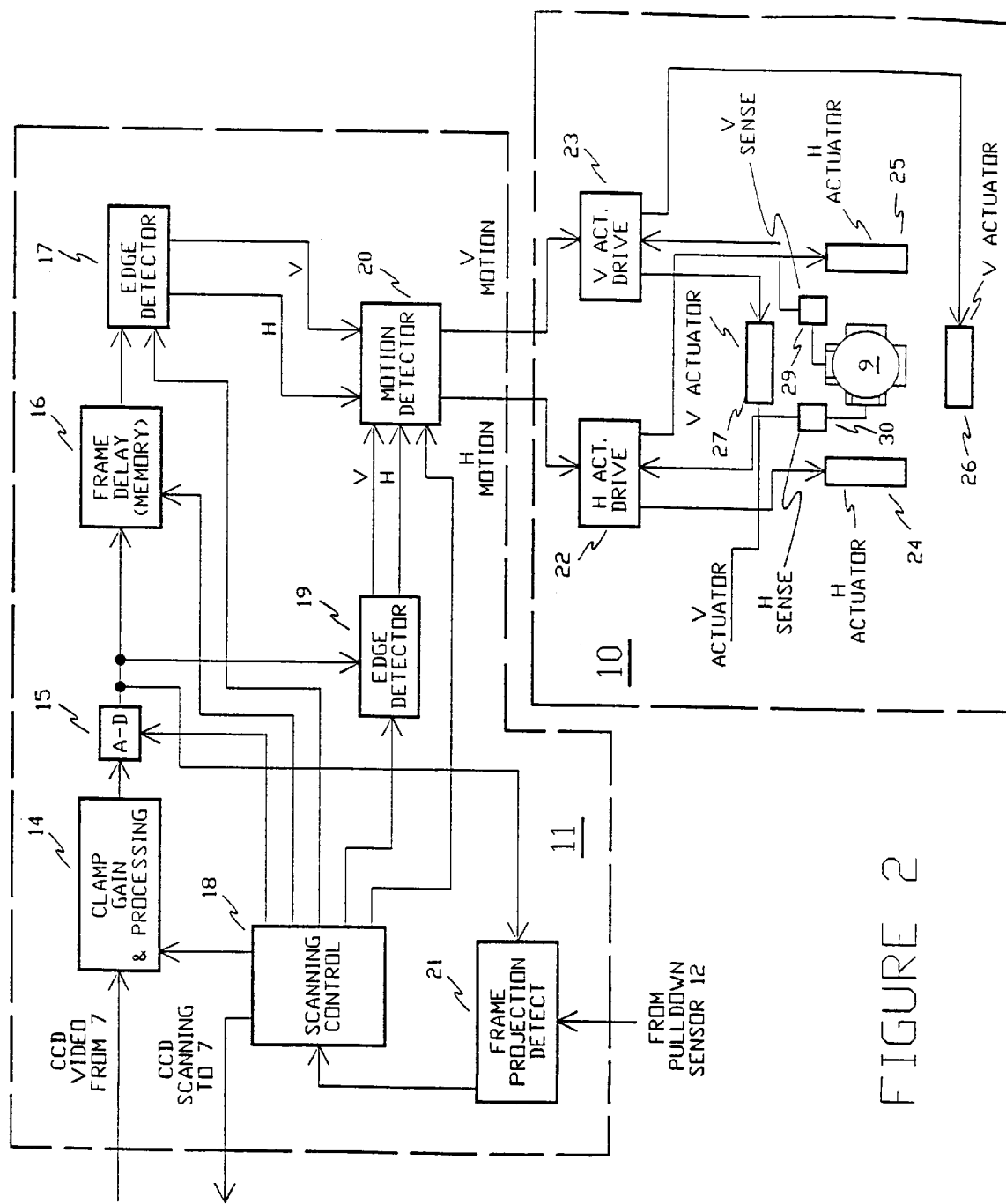
FIG. 2 shows a diagram of the internal components of elements 9, 10 and 11 of FIG. 1.

FIG. 2 shows a detailed diagram of the CCD and stabilization electronics 11 and the optics support and movement electronics 10 as they are coupled to the correction optics 9. The video from the CCD array 7 is coupled to analog processing circuitry shown as clamp and gain circuit 14 where the sampled analog signal is conditioned for application to an analog to digital convertor 15. A-D 15 outputs a digitized version of the CCD video which is coupled to frame delay or memory 16, and an edge detector 19. If it is desired to use the CCD video to detect film intermittent movement, the video from the A-D may also be coupled to the Frame Projection Detector 21 with, or in place of the signal from pulldown sensor 12. The frame delayed video from 16 is also coupled to an edge detector 17.

Edge detectors 17 and 19 compute horizontal and vertical edges and couple these edges to a motion detector 20 where the motion between a reference, which in the preferred embodiment is the previous displayed image stored in the frame delay 16, and the current frame from 19 are compared to determine the degree of movement. The edge detectors 17 and 18 may be eliminated if the sensor CCD array is made to be edge sensitive by its construction. Motion detector 20 operates to subtract the previous amount of correction from the H and V edges from 17, and then correlate these corrected edges with the H and V edges from 19 in the horizontal and vertical directions to compute horizontal and vertical movement. It would also be possible to store only the H and V edges from 19 in the Frame delay 16, thus eliminating the redundant edge detector 17. This will require some additional manipulation of the memory since two signals will be stored rather than one.

The reference may also be derived by spatially or temporally integrating or filtering the images in a recursive or other type filter in order to arrive at an estimated central image representing the optimal position of the image. Such a reference has the advantage of reducing error accumulation in the motion detector, since any positional errors are integrated or filtered out of the system by utilization of a reference which represents a sort of spatially average of the jittering images. Such a recursive filter may be simply implemented by storing into the memory a small percentage of the new video and a large percentage of the output of the memory. $1/32$ and $31/32$ are the preferred percentages, however others may be used providing their sum is precisely are equal to one. Such recursive filters are well known in the art.

Once the Motion Detector 20 has computed the proper amount of motion of the present frame with respect to the displayed position of the previous frame, the H and V motion amounts are coupled to the Optics Support and Movement circuit 10.

The Optics Support and Movement circuit 10 receives the H and V motion signals and provides a corresponding amount of actuator drive signal to the H and V actuators 24, 25, 26 and 27 to cause the movable element of the Correction Optics 9 to move and thus reposition the image to the proper location. The Optics Support and Movement circuit 10 also includes H and V position sensors 29 and 30 which sense the position of the movable element in order to verify its proper position. In the diagram shown, the Correction Optics 9 consists simply of a transmissive flat element which for light is known as an optical flat. The transmissive flat element is preferred to have a diameter which will allow the full beam of light from the projection lens 6 to pass through with minimum attenuation and a thickness approximately 20% of the diameter, and is preferred to be coated for maximum light transmission. The diameter is preferred to be 1.5 times the diameter of the ½ intensity diameter of the light beam. Correction is simply achieved by varying the tilt of the flat which causes diversion of the light beam due to refraction in the denser optical flat.

Element 9 is mounted on springs or a gimbal (not shown) behind the actuators 24–27 (in the direction perpendicular to the drawing) in order that the magnets on element 9 may be attracted or repulsed by the electromagnetic field created by the actuator. The attraction and repulsion will cause the optical flat 9 to tilt about its center, up or down, left or right. By tilting the optical flat 9, the projected beam is correspondingly caused to be displaced up or down, left or right.

Figure 7:
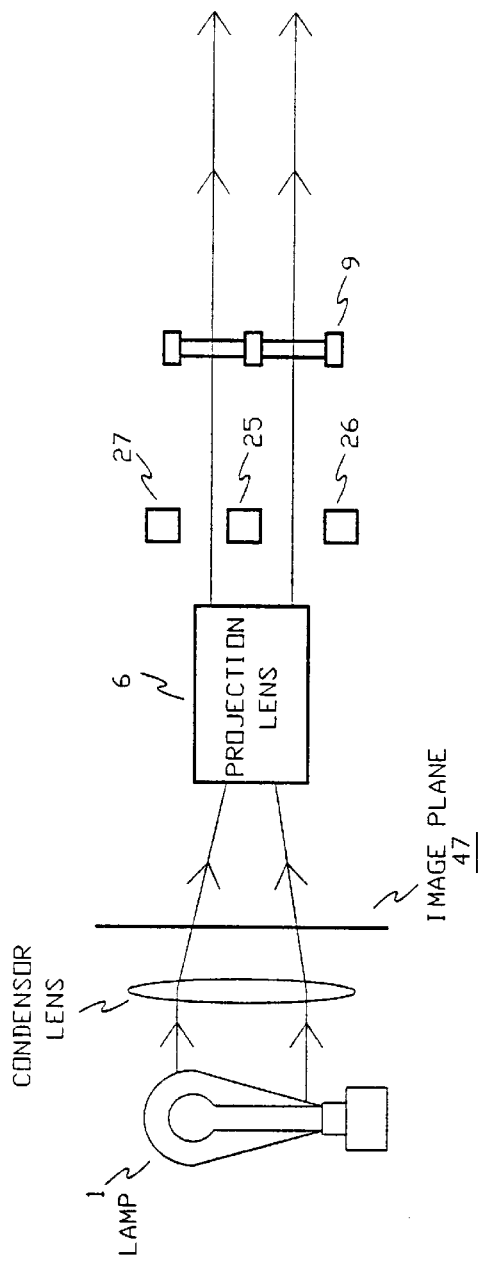
FIG. 7 shows a side view of the image projection path of a projector including the invention.

FIG. 7 shows a side view of the lamp 1, image plane 47, projection lens 6, actuators 25, 26 and 27, and the optical flat with attached magnets 9.

Figure 8:
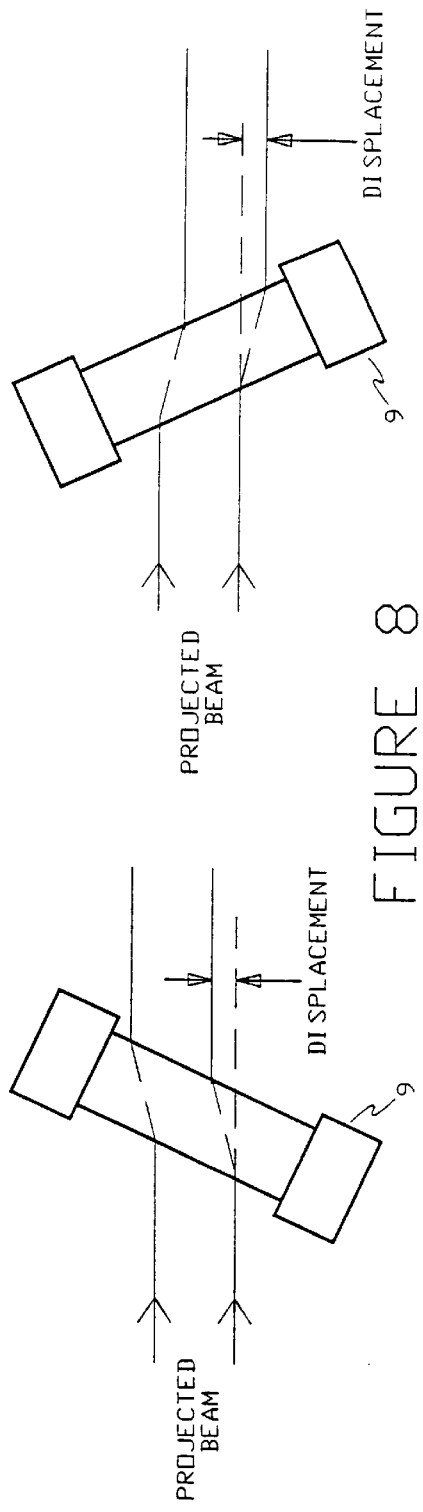
FIG. 8 shows exaggerated side views of the preferred optical flat used for spatial correction of an image.

FIG. 8 shows exaggerated side views of the optical flat 9 tilted up and down demonstrating how the light beam is moved by the tilting of 9. While the range of correction is limited with this type of correction optics, it performs well and is inexpensive to construct. It can be placed close to the front of the projection lens where there is usually room on existing projectors, and it is out of focus, thus dust and imperfections will not adversely affect the projected image. It also does not adversely affect the focus of the projected image, and allows operation with various lenses such as standard and anamorphic lenses. Alternatively, Correction Optics 9 can be placed anywhere in the projected beam, in front, behind or inside the projection lens.

If it is desired to increase the correction range of the correction optics element 9, one of ordinary skill in the art will be able to resort to various alternate designs using other optical components like mirrors, wedges and/or lenses to achieve the increased range, as will be known from the teachings herein. The methods of actuating 9 may be changed as well, for example by driving with solenoids, piezoelectric actuator cells, linear stepper motors or other well known actuating mechanisms.

In the preferred embodiment, there is little or no rotation of the image, and thus rotation correction is not provided. It is quite possible however to provide a third rotation correction circuits and actuators should such correction be desired. The Motion Detector 20 will develop a rotation error from the H and V edges and couple that error to a rotation actuator through a rotation driver. A rotation sensor would also be desired. An optical device known as a dove prism is capable of performing optical rotation. The image is projected through the longitudinal axis of the prism. To rotate the image, the prism is mechanically rotated about the longitudinal axis which causes image rotation through an angle twice as much as prism rotation. Such prisms and the mechanical positioning devices to controllable rotate them are available from numerous optical suppliers, including the aforementioned Edmond Scientific and Oriel Corporation.

Figure 3:
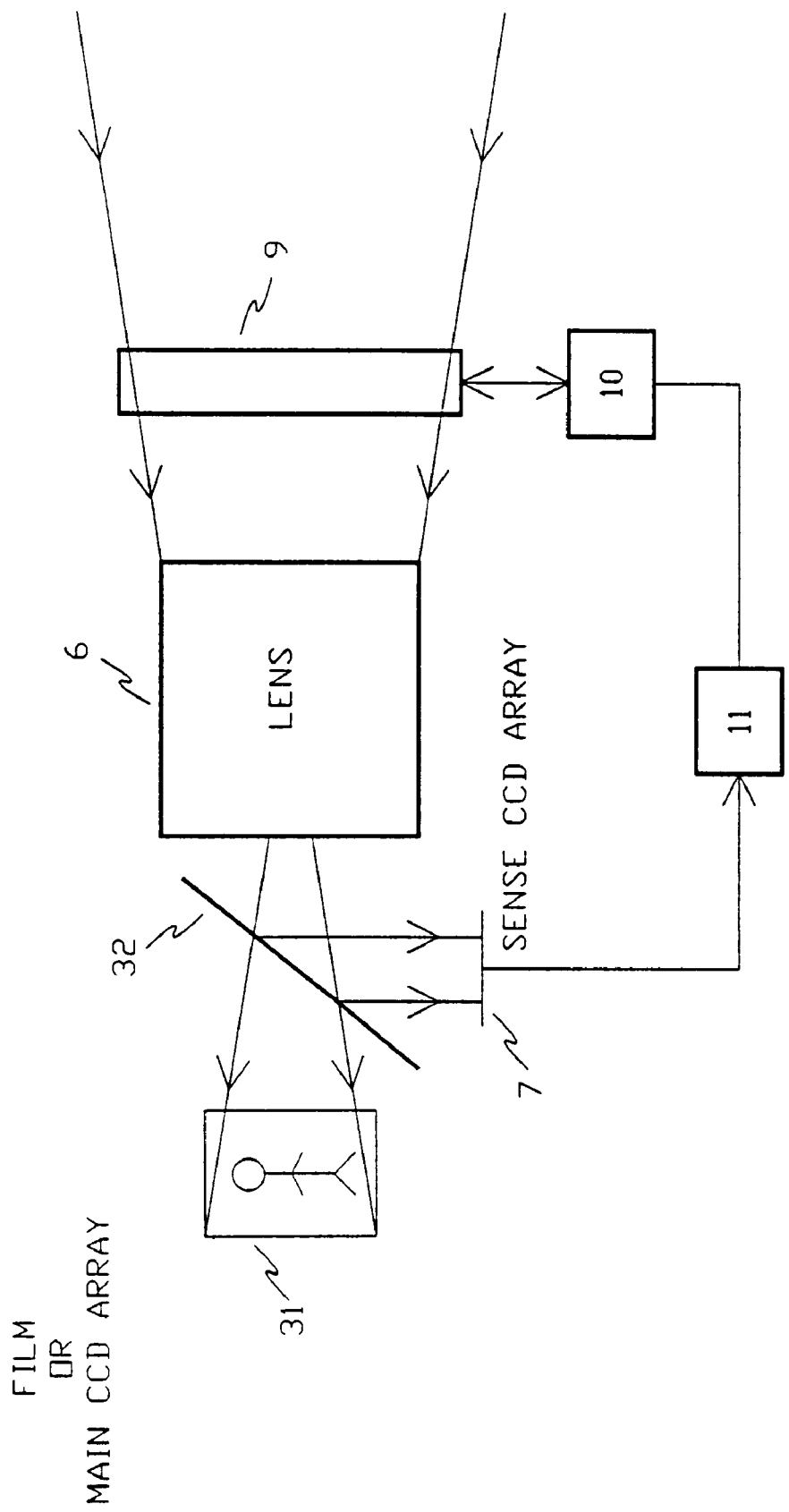
FIG. 3 shows diagram of the preferred embodiment of the invention as used with a television camera.

FIG. 3 shows how the invention may be used in a camera system. Illumination is provided through the lens 6 and on to a film or other sensor 31. Light from the image may be passed through a beam splitter 32 in order that light to which the sense CCD array 7 is sensitive is coupled thereto. The light falling on the array 7 is thus used to adjust the correction optics 9 via circuits 10 and 11 as in FIG. 1. Alternatively, the sense CCD array 7 may be optically coupled to view the surface of the film or sensor 31, if that surface reflects enough light to which the sense CCD array is sensitive. The beam splitter 32 could also be used with the projector of FIG. 1. There is no requirement that this camera be a motion camera, as the system will operate as well with still imaging.

When film is used for 31, an LCD, rotating mechanical or other shutter is provided in the correction optics 9 or elsewhere in the optical path. The shutter operates to pass only light the film is not sensitive to or otherwise prevent exposure, except when the film is being exposed when it passes light the film is sensitive to. LCD shutters or light valves are well known in the art and are available from a number of suppliers including Meadowlark Optics, 7460 Weld County Road 1, Longmont, Colo. 80504. Mechanical shutters are also well known, such as the prior art rotating shutter 5 of FIG. 1.

In the case of a television or other electronic camera, 31 may be an electronic sensor such as a CCD array as is well known in the art. The shutter in 9 may be eliminated if the sensor can be turned on and off. The electronic sensor is caused to turn on and off in order that the image position may be adjusted while the sensor is off, with the sensor turned on for exposure after the image is properly positioned by 9.

With all of these systems, light is coupled from the image to the sense CCD array 7, but exposure of 31 is blocked. The sense CCD operates with 9, 10 and 11 to adjust the position of the image. When the image is properly adjusted, the exposure of 31 is commenced. It is possible to maintain the adjustment of the image during the exposure simply by maintaining the operation of the system therewith. As with the alternate location of 7 and 8 in FIG. 1, the camera may also arrange 7 to view the image directly through a separate lens. It would also be possible to eliminate the sense CCD array 7 and use the Main CCD Array for both sense and recording functions by simply coupling the output signal to 11.

FIG. 4 shows a suitable arrangement for the Sense CCD Array 7 which is comprised of two linear CCD arrays 33 and 34 which are preferred to comprise 512 elements each. The Fairchild CCD153 element will work well for this element and is available from Loral Fairchild, Imaging Sensors, Milpitas, Calif. 95035. Other sensors which would be suitable for this function are available from. Dalsa, Inc. 605 McMurray Road, Waterloo, Ontario, Canada N2V 2E9. The two arrays are mounted perpendicular to one another with one directly behind the other, with the image being optically coupled to be focused on the sensors. The back array has the middle few elements blocked by the front element, however this results in only a slight loss of performance as these blocked elements may be masked in the correlation IC. Light from the image is focused on these sensors in order that the output will represent an intensity function of the image in one vertical line and one horizontal line. By the use of single line CCD sensors, the need for the edge detectors 17 and 19 is eliminated.

FIG. 5 shows an alternate arrangement for the Sense CCD Array 7 which is comprised of two linear CCD arrays 38 and 39 which are also preferred to comprise 512 elements each. As is shown in this figure, the sensors can be arranged separately, with each one having an optical coupling of the image. The two arrays are mounted perpendicular to one another on opposite sides of a beam splitter which is utilized to split the light from image 35 which is focused by lens 36 on the two. In this fashion, all of the CCD elements are illuminated, but at the expense of an overall light reduction for each one. Alternatively, two lenses may be used one to independently optically coupled each sensor to the image.

FIG. 6 shows the signal processing for the stabilization electronics of 11 when used with the Sense CCD Array 7 as configured in FIG. 4 or FIG. 5. Each array is coupled to a Clamp Gain and Processing circuit 40 which processes the sampled analog video signal from the array and couples it to the A-D 41. Such arrays, clamp gain processing circuits and A-D convertors are well known in the art as single line CCD array, digital output cameras. It is possible to purchase a single line CCD array camera having all of these components integrated from various manufacturers. In particular a camera using the suggested CCD153 element, the DDC1200R camera is available from the aforementioned Loral Fairchild. This camera achieves a 26 $\mu$s minimum exposure time and a 20 MHz pixels per second maximum video output rate. Two such cameras are used, one focused horizontally on the image and one focused vertically on the image. Dalsa, Inc. also supplies line array cameras. An external A-D convertor is needed with the DDC1200R with a preferred conversion accuracy of 8 bits. The construction of a proper convertor is well within the ability of one of ordinary skill in the art. The Brooktree Bt252 8 bit image digitizer is suitable for this A-D convertor. This part and application notes on the theory, construction and proper operation of this A-D convertor is available from Brooktree as well.

The 8 bit digital video from 41 is coupled to a correlator 43 of 512 bits in length and a delay 42 which is preferred to be 512 bits long. The delayed signal is first clocked into the correlator 43 and held. Next the new 512 bits are clocked into the correlator and past the old 512 bits as they arrive from the A-D. The new 512 bits are simultaneously clocked into the delay 42 for storage until needed at the next frame. Correlators are well known in the art and the TRW TMC2023 will be found to be a suitable component for constructing this portion of the invention. This part is available from Raytheon (formerly TRW LSI Products) La Jolla, Calif. 92038. Applications notes on the theory, proper construction and operation of multi bit correlators are also available from Raytheon. As the new 512 bits are clocked through the correlator and past the old 512 bits a correlation or measure of the matching of all of the samples is performed. If for example an old bit has the value of 0 and a new bit a value of 225, the correlation is 256-(225-0) or 31, not a high match. If the two bits have the same value Y, the correlation of those two bits is 256-(Y-Y) or 256, a perfect match. The correlator operates to sum all of the individual matches over the 256 samples which are being compared. These sums will vary clock by clock from 0 to (512×256). For unmatched signals the correlation will hover around mid range, and for matched signals the correlation value will be very high, exhibiting a pronounced peak as the new signal is shifted through the correlator and comes into alignment with the old.

The peak position circuit counts the number of clock cycles since the start of the frame, and stores the count of the clock cycle at which the highest correlation number occurs. For example, if the peak occurs at 512 clocks, the two signals are matched and thus the two images are coincident. If the peak occurs at 514 clocks, the new image is displaced two CCD elements to the right of the old (assuming the first element is on the right of the image).

The action of measuring the location of the peak is performed simply by storing the count and correlation value each time the new correlation value is larger than the stored correlation value. After 1024 clocks, the peak position circuit will have stored the count where the highest peak occurred, which count corresponds to the number of clock cycles where the new and old video signals matched. The difference between these counts (normalized to 512 counts or no error) is the number of clock cycles of the displacement between the new and the old frame in units of CCD element spacing. The difference of new and old counts is output from 44 as the frame to frame motion value.

The previous frame to frame motion value stored in 45 is subtracted by 46 from the current frame to frame motion value from 44 to arrive at the motion of the current frame with respect to the position (on the screen) of the displayed image. The motion value is then coupled to the Optics Support and Movement circuit 10 where it is used to reposition the Correction Optics 9.

At scene changes, or where there are no edges to correlate, there will be no clear correlation peak. In this event, the Peak Position circuit 44 will sense that the correlation number is below a threshold. The threshold is preferred to be 98304 (384×$2^8$), that is the number of matches for a correlation peak must be greater than 384×$2^8$. If the peak is below the threshold, the Peak Position circuit 44 outputs a zero frame motion value and clears the store 45 to zero, which will cause a zero motion value to be passed to 22 (or 23)

As will become apparent to one or ordinary skill in the art from the present teachings, the invention may also be utilized as resolution enhancing system. Images may be recorded in high resolution with subsequent display of each high resolution image with a display device which displays a plurality of frames of lower resolution images. The image correction optics 9 is utilized to position the pixels of the lower resolution images to the proper position on the displayed image. For example, an image is recorded with 200 pixels across the image width A first frame is displayed utilizing all of the odd pixels, 1, 3, 5, etc. followed by a second frame display of all of the even pixels 2, 4, 6, etc. During the display of the second frame the correction optics causes the image to shift by a pixel width, causing pixel 2 to be displayed between pixels 1 and 3, 4 between 3 and 5, etc. This operation is simply achieved by adding a small offset to the Motion signal from 20. This operation may be performed in either presentation or capture of images.

The description of the preferred embodiment of the invention, as well as several alternate embodiments are made herein by way of example with resort to some generality as to the specific details of individual elements which are well known to those of ordinary skill in the art. Thus from the teachings herein, one of ordinary skill in the art will be able to practice the invention and in particular to successfully construct and practice the preferred embodiment without resulting to further invention or excessive experimentation.

While the preferred embodiment of the invention described herein finds considerable use in the film projection field, it will be recognized by those skilled in the art to which various image devices are found that from the teachings herein the invention may be adapted to be utilized with such other devices.

It will be appreciated by those of ordinary skill in the art that the terms given herein which are particular to a given art, such as the film projection field, are meant by the inventor to also encompass the similar or kindred terms of other fields. For example the term projector is meant to apply to all, projection, viewing and display devices whether for film, television, computer, printer or other fields. The term gate weave is meant to apply to any image motion, jitter and/or distortion, whether by the image itself or the projecting or viewing apparatus. The term viewing is intended to include viewing, analysis, acquisition, inspection or other use of an image by eyes or machines. The terms optical and optics are intended to pertain to all particle or electromagnetic radiation pertaining to images, rather than to just the common meaning associated with visible light. The term image is meant to include all the various forms of the image, for example the image on the film, the image as projected on the Sense CCD array, the image as projected on the projection screen, the image being recorded, the image stored as electronic information and the image on the recording sensor. Image, depending on the context, may refer to a virtual image, an image on a recording medium such as electrons with a memory, film or tape, emulsion, ink, chemicals or other particles on a base such as film or paper. The word image is to be interpreted with breadth unless specifically defined as pertaining to a particular form. It will also be understood that while the words element, device and circuit may sometimes carry with them some implication of optical, mechanical, or electrical embodiments, it is well known in the art that they have broader meanings. For example, an element is not just an element of an optical lens, but may also be a mechanical, electrical or fluid element.

Although the description of the preferred embodiment of the invention is made herein with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. The method of displaying an image comprising a first number of image elements, said method utilizing a display device which displays said first number of image elements by time sequential display of a plurality of sets of lesser numbers of said image elements, said plurality of sets including a first set and a second set, said method including the steps of:
    a) providing said first set in response to said first number of image elements;
    b) utilizing said display device to display said first set via an optical path having at least one optical element;
    c) providing at least said second set in response to said first number of image elements;
    d) after step b) utilizing said display device to display said second set via an optical path obtained by altering the position of said optical element.

2. The method of displaying an image made up of a first number of image elements, on a surface, said method utilizing a display device having a second smaller number of display pixels, said method including the steps of:
    a) selecting a first set of said image elements;
    b) with said display device, displaying said first set on said surface via an optical path having at least one optical element;
    c) selecting at least a second set of said image elements;
    d) displaying said second set on said surface via said optical path which is changed by altering the position of said optical element.

3. The method of displaying an image of a first resolution which is made up of image elements, said method utilizing a display device of lower resolution and including the steps of:
    a) providing a first set of display elements in response to said image elements;
    b) using said first set of display elements to display a first lower resolution image with said display device;
    c) providing at least a second set of display elements in response to said image elements;
    d) using said second set of display elements to display a second lower resolution image with said display device after said display of step b);
    e) optically altering the display of at least one of said first and said second lower resolution images in order that individual image elements of each said set are displaced from each other when displayed.

4. The method as claimed in claim 1, 2 or 3 wherein said image elements recited in the preamble thereof are arranged in a matrix of lines of elements and said first set of a) includes the odd or even numbered ones of said elements of at least one of said lines and said second set of c) includes the others of said odd or even numbered ones of elements of said at least one of said lines and said first set and said second set are displayed at differing times.

5. The method as claimed in claim 1, 2 or 3 wherein said altering operates to cause elements of said first set displayed in b) to be time sequentially displayed and interleaved with elements of said second set displayed in d).

6. An apparatus for displaying an image made up of a first number of image elements arranged in an array of lines of elements thereby having a first resolution, said apparatus using a display device which displays a second lower number of display pixels arranged in a frame, said apparatus including:
    a) a frame circuit responsive to said image and providing a plurality of lower resolution frames of said image elements as compared to said first resolution, said plurality of lower resolution frames including a first frame and a second frame;
    b) a display circuit utilizing said display device to sequentially display said plurality of lower resolution frames of image elements via an optical path;
    c) a deflection circuit for moving an optical element in said optical path thereby causing deflection of said display of one or more of said plurality of low resolution frames.

7. An apparatus for displaying an image made up of a first number of image elements arranged in an array of lines of elements thereby having a first resolution, said apparatus using a display device which displays a second lower number of display pixels arranged in a frame, said apparatus including:
    a) a frame circuit responsive to said image and providing a plurality of lower resolution frames of said image elements as compared to said first resolution, said plurality of lower resolution frames including a first frame and a second frame;
    b) a display circuit utilizing said display device to sequentially display said plurality of lower resolution frames of image elements via an optical path;
    c) a deflection circuit for moving an optical element in said optical path thereby causing said optical element to take on a first position during the display of said first frame of b) and a second position during the display of said second frame of b).

8. The apparatus as claimed in claim 6 or 7 wherein one said first frame of a) is responsive to the odd numbered elements of a given line of elements and said second frame of a) is responsive to the even numbered and interleaved elements of said given line of elements.

9. The apparatus as claimed in claim 6 or 7 wherein said deflection circuit of c) causes elements of said first frame of a) to be displayed along the same said optical path and interleaved with said elements of second said frame of a).

10. The apparatus as claimed in claim 6 or 7 wherein said display circuit of b) displays said first frame and said second fame at different positions in time sequential fashion by projecting light from said display element via said optical path onto a viewing surface with said optical element of c) being moved such that the position of said first frame as projected on said surface is different from the position of said second frame as projected on said surface.

11. The method of displaying a plurality of images in time sequential fashion at different positions, said images being made up of pixels, said method including the steps of:
   a) providing said plurality of images to a display in time sequential fashion, said plurality including at least said first image and said second image;
   b) displaying said first image along an optical path;
   c) after step b), displaying said second image along said optical path;
   d) altering said optical path to cause said first image and said second image to be displayed at different positions thereby interleaving said pixels thereof.

* * * * *